April 6, 1948.　　　　K. A. KAIL　　　　2,439,168
CONSTANT SPEED PROPELLER SIMULATING MEANS FOR AVIATION TRAINERS
Filed July 31, 1943　　　3 Sheets-Sheet 1

FIG. 1

KARL A. KAIL
*INVENTOR.*

BY

ATTORNEYS.

April 6, 1948.                K. A. KAIL                    2,439,168
        CONSTANT SPEED PROPELLER SIMULATING MEANS FOR AVIATION TRAINERS
                    Filed July 31, 1943          3 Sheets-Sheet 2

FIG. 2

KARL A. KAIL
*INVENTOR.*

BY

ATTORNEYS.

April 6, 1948.　　　　K. A. KAIL　　　　2,439,168
CONSTANT SPEED PROPELLER SIMULATING MEANS FOR AVIATION TRAINERS
Filed July 31, 1943　　　3 Sheets-Sheet 3

KARL A. KAIL
*INVENTOR.*

BY

ATTORNEYS.

Patented Apr. 6, 1948

2,439,168

UNITED STATES PATENT OFFICE 2,439,168

CONSTANT SPEED PROPELLER SIMULATING MEANS FOR AVIATION TRAINERS

Karl A. Kail, Montrose, Pa., assignor to Link Aviation, Inc., a corporation of New York Application July 31, 1943, Serial No. 496,898

10 Claims. (Cl. 35—12)

My application, which is a continuation in part of my copending application Serial Number 452,739, filed July 29, 1942, relates to aviation trainers and is particularly adapted to be used in trainers of the type commonly known as "Link trainers." Trainers of this type are disclosed in United States Patents Numbers 1,825,462 and 2,099,857.

It is the general object of my invention to provide means in a grounded aviation trainer simulating the functioning of the manifold pressure gauge and tachometer in a plane equipped with a constant speed propeller.

It is another object of my invention to provide means whereby the simulated manifold pressure gauge in a grounded aviation trainer will respond to changes in simulated throttle setting, simulated governor control setting and simulated altitude means in simulation of the functioning of the manifold pressure gauge in a plane equipped with a constant speed propeller in response to the corresponding factors of throttle setting, governor control setting and altitude.

It is a further object of my invention to provide means whereby the simulated tachometer in a grounded aviation trainer will respond to changes in simulated throttle setting, trainer attitude and governor control setting in simulation of the functioning of the tachometer in a plane equipped with a constant speed propeller in response to the corresponding factors of throttle setting, attitude and governor control setting.

It is still another object of my invention to provide in a grounded aviation trainer means whereby the student "flying" the same will be required to perform the same acts that he would have to perform were he flying a plane equipped with a constant speed propeller.

In order that the following description may be more readily understood reference is made to the accompanying drawings which show the preferred embodiment of my invention and in which.

General description of trainer

Figure 1:
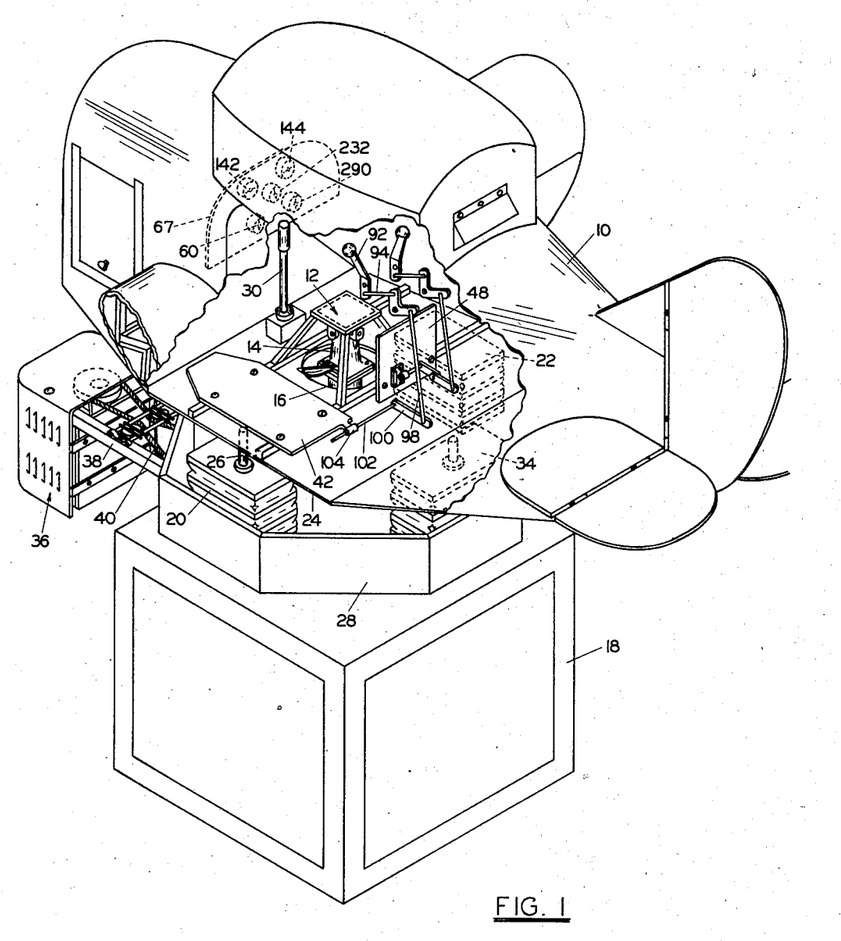
Fig. 1 is a general perspective view of a Link trainer in which this invention is particularly useful, certain parts being cut away for purposes of illustration.

Referring to Fig. 1 it will be seen that such a trainer comprises a fuselage 10 mounted upon a universal joint designated generally by 12 so that the trainer may dive, climb and bank in either direction in simulation of the corresponding movements of a plane in actual flight. The lower part of this universal joint 12 is integral with a central supporting member 14 which is rigidly affixed by suitable means to a lower supporting member 16 which in turn is rotatably mounted in a suitable bearing housing (not shown) in the base 18 of the trainer. Two pairs of bellows known as the aileron and elevator bellows are provided. The left aileron bellows is designated 20 and the right 22. Each of these bellows is attached to the under side of the floor 24 of the trainer fuselage by means of a rod 26 and the lower ends of each of these bellows is affixed to a cross piece (not shown) carried by octagon 28. A system of vacuum, valves and linkages is provided whereby when the control stick 30 in the trainer fuselage 10 is moved to the left aileron bellows 20 is collapsed and right aileron bellows 22 is expanded, and the trainer fuselage 10 banks to the left. Movement of control stick 30 in the opposite direction results in an expansion of left aileron bellows 20 and a contraction of right aileron bellows 22 and the trainer banks to the right.

The front elevator bellows is not shown in Fig. 1 but it is on the side of universal joint 12 opposite the rear elevator bellows which is numbered 34. These bellows are attached to the floor 24 of the trainer fuselage 10 and to the cross piece carried by octagon 28 in the same manner as are the aileron bellows 20 and 22. Whenever control stick 30 is pushed forward, through a system of vacuum, valves and linkages the front elevator bellows is collapsed, the rear elevator bellows 34 is expanded and the trainer fuselage 10 assumes a diving attitude. On the other hand, movement to the rear of control stick 30 results in a contraction of rear elevator bellows 34 and in an expansion of front elevator bellows, the result being that the trainer assumes a climbing attitude.

Also seen in Fig. 1 is a turning motor 36 held by arms 38 rigidly affixed to octagon 28. Turning belt 40 is also provided. Whenever the left rudder pedal (not shown) in the trainer fuselage 10 is pressed, by means of another system of vacuum, valves and linkages the trainer fuselage 10 is turned toward the left while in the event the right rudder pedal is pressed through a similar system the trainer fuselage is turned to the right.

From the foregoing it will be realized that the trainer fuselage 10 of the described trainer may be made to dive, climb, bank and rotate in simulation of the diving, climbing, banking and turning of a real plane in actual flight. All of the foregoing means form no part of the present invention except in combination with means to be later described and for a detailed description thereof reference is made to United States Patents 1,825,462 and 2,099,857.

In a plane in actual flight there is provided an air speed indicator which indicates the speed of travel of the plane through the surrounding air. In order that trainers of the type being described may be of greater utility means known to the prior art have been incorporated therein in order that a simulated air speed indicator will respond to the settings of the simulated throttle in the trainer and to changes in the attitude of the trainer fuselage just as the air speed indicator in a real plane responds to changes in the setting of the throttle therein and to changes in the attitude of the plane. Such means will now be described in order that the latter description of my invention may be more readily understood.

Figure 2:
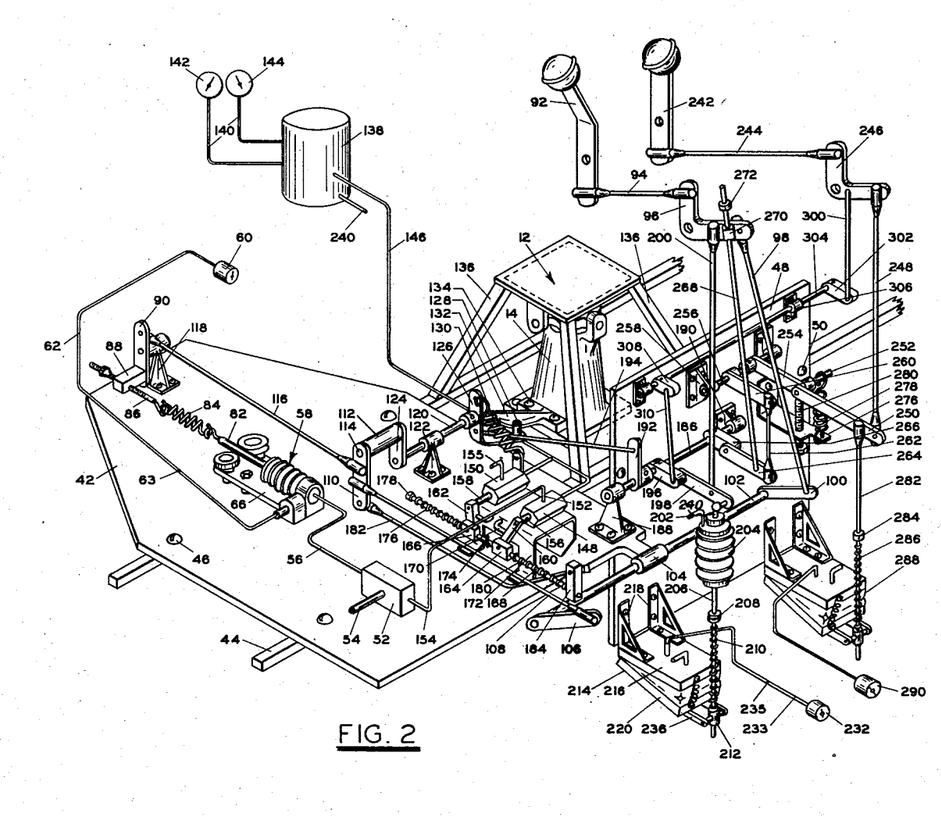
Fig. 2 is a diagrammatic illustration of the principal parts of this invention.

The apparatus which is shown in Fig. 2 includes most of the detailed parts of this invention, said apparatus as seen in Fig. 2 for the most part being attached to platform 42 which is affixed to the frame 44 of the bottom of trainer fuselage 10 by means of bolts 46 or to panel 48 which likewise is attached to cross pieces 44 by means of bolts 50. A manifold 52 is connected to a vacuum pump (not shown), referred to in the art as the altitude pump, by means of tube 54, and therefore, manifold 52 always contains reduced air pressure. Suitable means are associated with the vacuum pump to maintain the pressure within manifold 52 at the desired level. By means of vacuum connection 56 manifold 52 is connected to air speed regulator bellows designated generally by 58. Air speed regulator bellows is in turn connected to air speed instrument 60 by means of vacuum connection 62. As seen in Fig. 1 air speed instrument 60 is placed on the instrument panel 67 inside the trainer fuselage. Bleed hole 63 is provided in line 62.

Figure 3:
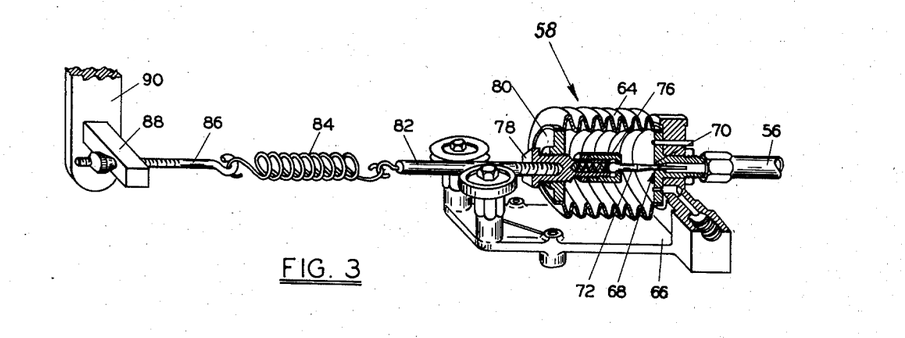
Fig. 3 is a cross-sectional view of the air speed regulator bellows.

In Fig. 3 the numeral 64 refers to air proof bellows preferably made of light metal construction. This bellows may be mounted in any suitable manner upon a frame member 66, which in turn is mounted upon the platform 42. Within bellows 64 is a needle valve designated generally by 68 and comprising a seat 70 and a needle 72. Seat 70 is rigidly affixed to frame member 66 while needle 72 is attached to extension 76 of plug 78 which is screwed in the end 80 of the bellows. Link 82 is also screwed into plug 78 as shown. It will be seen that link 82, spring 84, link 86 and extension 88 complete the connection from needle 72 to lever 90.

When the lower part of lever 90 is moved to the left in Figs. 2 and 3, link 86, spring 84 and link 82 will move likewise and the left end 80 of bellows 64 will be pulled to the left. Bellows 64 will therefore be expanded and at the same time needle 72 will be pulled from its seat 70 and reduced air pressure from the manifold 52 will be applied through connection 56 to the bellows 64 and by means of connection 62 to the air speed instrument 60. The detailed construction of air speed instrument 60 forms no part of the instant invention, rather it may be of any suitable well-known type providing it has an indicator hand whose position varies appropriately with the pressure within bellows 64. As the pressure within bellows 64 becomes gradually reduced through the action of vacuum source 52 it gradually collapses, thereby drawing link 82 and the members connected thereto to the right in Fig. 3. This gradual closing movement continues until the pressure within bellows 64 and the tension of spring 84, both of which forces tend to expand bellows 64, exactly equal the atmospheric pressure on the outside of the bellows, which last force tends to collapse the bellows and, therefore, close needle valve 68. When these opposing forces are balanced vacuum source 52 will exhaust from the bellows the exact amount of air that enters through bleed hole 63 in line 62.

Because of the above equation of forces, by varying the tension upon spring 84 the amount of vacuum necessary within bellows 64 to balance the atmospheric pressure on the outside of the bellows may be varied. This varying vacuum within air speed regulator bellows 64 will in turn vary the reading of air speed instrument 60. Hence, by moving the lower end of lever 90 to the right or left in Fig. 3 the tension upon spring 84 will be decreased or increased respectively and the vacuum within bellows 64 will correspondingly be decreased or increased. The greater the vacuum within this bellows the higher the reading of air speed instrument 60 which indicates the assumed air speed of the trainer.

A simulated throttle control lever 92 is shown in Fig. 2 and it is assumed to be associated with the engine of the trainer. This throttle, as seen in Figs. 1 and 2, is located in the interior of fuselage 10 within the reach of the student. It will be noticed that the lower end of throttle 92 has pivotally connected thereto a link 94 which in turn is pivotally connected to the upper end of bell crank 96 which is pivotally mounted upon a suitable part of the interior of fuselage 10. Pivotally connected to the other end of bell crank 96 is the upper end of vertical link 98, the lower end of which is pivotally connected to the rear end of arm 100. The other end of arm 100 is rigidly affixed to shaft 102 which runs transverse of fuselage 10 and is pivotally mounted in extension 104 of platform 42. On the other end of shaft 102 is rigidly affixed arm 106 to the upper end of which is pivotally connected link 108. The other end of link 108 is pivotally connected to the central portion of walking beam 110. The upper end of this walking beam is pivotally attached to horizontal stub shaft 112 at the point 114. Also pivotally attached to walking beam 110 is link 116, the other end of which is likewise connected to lever 90 to which reference has been previously made. Lever 90, it will be seen, is pivotally held by bracket 118 which is affixed to platform 42.

It will be recalled that any movement of the lower end of lever 90 to the right or left in Fig. 2 through the action of link 86, spring 84, link 82 and needle valve 68 will result in a change in the reading of air speed indicator 60. A movement to the left of the upper end of simulated throttle control lever 92, which movement simulates an opening of the throttle of an engine in a real plane, causes link 94 to move to the right in Fig. 2 and through the action of bell crank 96 vertical link 98 is moved downwardly as is the end of arm 100 to which it is attached. This movement of arm 100 is transferred by means of shaft 102 to arm 106 which in turn moves link 108 toward the rear of the trainer fuselage, or to the right as seen in Fig. 2. Walking beam 110 in this instance is pivoted about the point 114 and its lower end moves in the same direction as does link 108, thereby pulling link 116 toward the right in Fig. 2. The upper end of lever 90 moves in the same direction while extension 88 and link 86 move in the opposite direction, i. e., to the left in Fig. 2. An increase in the tension upon spring 84 results, and, as previously explained, through the action of manifold 52 and needle valve 68 air speed indicator 60 registers a higher assumed trainer air speed.

It will be readily understood that a movement to the right in Fig. 2 of the upper end of simulated throttle 92 in simulation of the closing of the throttle in a real plane will result in opposite movements of the immediately aforedescribed parts and air speed indicator 60 will register a lower assumed air speed of the trainer.

A change in the setting of throttle 92 does not cause an instantaneous total change in the indicated air speed but instead the changed throttle setting causes a gradual change in the vacuum within bellows 64 and therefore a gradual change in the assumed air speed as indicated by instrument 60. This simulates the gradual response of a plane in flight to a changed throttle setting.

It will therefore be realized that means are disclosed for varying the indicated assumed air speed of the trainer as shown by the simulated air speed instrument in the trainer in accordance with the setting of the simlulated throttle in the trainer.

Means will now be described for causing the assumed air speed of the trainer as shown by air speed indicator 60 to vary with a change in the attitude of the trainer, i. e., when the trainer assumes a diving or climbing position. As seen in Fig. 2, a horizontal shaft 120 is mounted for rotation in brackets 122 (only one of which is shown) which are fixedly attached to platform 42 inside trainer fuselage 10. To the left end of shaft 120 is rigidly affixed arm 124 and to the upper end of this arm is rigidly affixed stub shaft 112 to which reference has been previously made. The arrangement of walking beam 110 and link 116 has been previously explained.

To the right end of shaft 120 is fixedly connected pitch action arm 126 which has a roller 128 suitably mounted upon the lower end thereof. Attached to the upper end of arm 126 is tension spring 130 the other end of which is affixed to platform 42. Pitch action cam 132 is rigidly affixed to member 14 by means of bolts 134. Spring 130 pulling upon the upper end of pitch action arm 126 maintains roller 128 in contact with pitch action cam 132 at all times.

As seen in Figs. 1 and 2, platform 42, brackets 122 and all of the other parts mounted upon platform 42 are suspended below universal joint 12 by means of members 136. Whenever the trainer fuselage 10 pitches in simulation of the climbing of a plane in actual flight the platform 42 also assumes a climbing attitude and it swings ahead of its level flight position, carrying with it all of the members affixed thereto. Roller 128 cannot move forward because pitch action cam 132 engages it. All of the parts affixed to platform 42 therefore move with respect to pitch action arm 126 as though roller 128 and the lower end of pitch action arm 126 were pushed toward the rear of fuselage 10, i. e., to the right in Fig. 2. The upper end of arm 126 and stub shaft 112 therefore move toward the head of the trainer fuselage as does the upper end of walking beam 110 which in this case pivots about the point where link 108 attaches thereto. (It is to be noted that link 108 is attached to walking beam 110 at the point where horizontal shaft 120 would intercept walking beam 110 if it were extended thereto. Link 116 and the upper end of lever 90 move to the left in Fig. 2 and the bottom of lever 90 moves to the right, decreasing the tension upon spring 84. As has been previously explained, a reduction in the tension upon spring 84 results in the gradual decrease in the assumed air speed of the trainer until air speed indicator 60 indicates the final appropriate assumed air speed for the prevailing positions of the trainer fuselage 10 and throttle 92.

On the other hand, if the trainer fuselage 10 is pitched in simulation of the diving of a plane in actual flight platform 42 assumes a diving attitude and it swings behind its level flight position, carrying with it all of the parts mounted thereupon. Tension spring 130 pulling upon the top of pitch action arm 126 maintains roller 128 in contact with pitch action cam 132. Brackets 122 therefore move with respect to pitch action arm 126 as though roller 128 and the lower end of arm 126 were pushed toward the head of the fuselage 10, i. e., to the left in Fig. 2. The upper end of arm 126 and stub shaft 112 therefore move toward the rear of the trainer fuselage as does the upper end of walking beam 110 which also pivots in this instance about the point at which link 108 is attached thereto. Link 116 and the upper end of lever 90 move toward the rear, the bottom of the lever 90 goes toward the head of the fuselage and an increase in the tension upon spring 84 results causing an increase in the assumed air speed of the trainer as indicated by instrument 60.

From the foregoing it will be realized that means are provided whereby the indicated air speed of the trainer may be changed by an opening or closing of the throttle and by a change in the attitude of the fuselage, in simulation of the changing of the indicated air speed of a plane in actual flight in response to corresponding movements.

A plane in actual flight also has therein an altimeter and a vertical speed indicator, the altimeter indicating the height of the plane above some point upon the earth's surface and the vertical speed indicator showing the instantaneous rate of change in the altitude of the plane. Although trainers of the type being described do not leave their stationary base the following means, also known to the prior art, have been incorporated therein for simulating the functioning of the vertical speed indicator and altimeter in a real plane.

In an airplane in actual flight a changed throttle setting will result in a change in the altitude of the plane, an opening of the throttle causing the plane to climb while a closing of the throttle will cause the plane to lose altitude. No change in the attitude of the plane necessarily results from a change in the throttle setting—the change of altitude may be caused by a difference in the "lift" resulting from the change in air speed of the plane. Inasmuch as there is a change in altitude resulting from a change in throttle setting the altimeter as well as the vertical speed indicator in the plane will reflect this change. The following means have been incorporated in trainers of the type being described to produce the correct responses of the altimeter and vertical speed indicator to a change in the setting of the throttle in the trainer.

Referring to Fig. 2, an equalizer tank 138 has connected to it by hose connections 140 a simulated altimeter 142 and a simulated vertical speed indicator 144. As seen in Fig. 1, these two instruments are on the instrument panel inside the trainer fuselage. Altimeter 142 shows the simulated altitude of the trainer, and it may be of any suitable known type providing its reading varies with the pressure within tank 138, the lower the pressure the greater is the indicated altitude. Vertical speed indicator 144 simulates in appearance the real instrument of the same name used in actual flight—when the pressure within tank 138 is decreasing the vertical speed indicator moves in a clockwise direction from the level flight position, thus indicating that the trainer is supposedly gaining altitude and moving in this direction a distance corresponding to the rate of assumed change of altitude. On the other hand, when the presure within tank 138 is increasing, the opposite result occurs, thus indicating an assumed descent of the trainer and the rate thereof. It is therefore evident that by changing the atmospheric pressure within tank 138 altimeter 142 will show the assumed altitude of the trainer and the vertical speed indicator 144 will show instantaneously the fact of ascent or descent and the rate thereof.

Equalizer tank 138 is connected by means of vacuum connection 146 to one of the ports of climb valve 148 and to one of the ports of dive valve 150. The second port 152 of climb valve 148 is by means of connection 154 in communication with manifold 52 while the second port 155 of dive valve 150 communicates directly with the atmosphere. The detailed construction of the climb and dive valves form no part of this invention and for a complete description thereof reference is made to the above-mentioned U. S. Patent 2,099,857. In order to understand the instant invention it is sufficient to know that in each of the valves 148 and 150 is a needle valve, in the case of the climb valve 148 the needle and seat being between the port communicating with connection 146 which goes to equalizer tank 138 and the port 152 which is connected by means of vacuum connection 154 with manifold 52. In the case of the dive valve 150 the needle and seat are between port 155 which opens directly into the atmosphere and the port which is connected by means of connection 146 with equalizer tank 138. Connected to the needles in each of the valves is a threaded stem, the outer ends of which are designated by the numerals 156 and 158. Threaded stem 156 works in the interior of climb valve 148 which is fitted for the reception thereof while stem 158 is a part of dive valve 150.

Fixedly connected to the end of threaded stem 156 is an operating arm 160 and a similar member 162 is connected to threaded stem 158. Each of the operating arms 160 and 162 is pivotally connected to one of the blocks 164 or 166 which are slidably mounted upon reciprocating link 168. A pair of stops 170 are fixed to the front of mounting 172 upon which the climb valve 148 and dive valve 150 are mounted. When arm 160 is in the position contacting its stop 170, climb valve 148 is closed and when arm 162 is in contact with its stop 170 the dive valve 150 is closed. Movement of arm 160 to the right in Fig. 2 opens the climb valve 148 which is right-hand threaded while a movement to the left of arm 162 opens the dive valve 150 which is left-hand threaded.

Fixedly attached to the central portion of reciprocating link 168 between blocks 164 and 166 is a stop 174 so when link 168 moves to the left in Fig. 2 stop 174 likewise moves in that direction, carrying before it block 166 which in turn carries arm 162 to the left, thereby opening dive valve 150 and making communication between port 155 leading to the atmosphere and equalizer tank 138. Atmosphere enters tank 138. At the same time, compression spring 176 which surrounds link 168 and which is held upon link 168 by a stop 178 will remain in its normal state but compression spring 180 which is similarly held upon link 168 will be contracted because block 164 and arm 160 remain stationary due to the provision of stop 170. Therefore, such a movement will not affect climb valve 148. However, a movement of link 168 to the right in Fig. 2 will open climb valve 148 thus admitting reduced air pressure from manifold 52 to equalizer tank 138 but this movement will not affect arm 162 of dive valve 150 and, therefore, dive valve 150 will remain closed.

Referring still to Fig. 2, it will be recalled that the lower end of walking beam 110 moves to the right or toward the rear of the trainer fuselage 10 when throttle 92 is opened, the arm in this instance pivoting about the point 114. It will be understood, therefore, that an opening of the throttle 92 will cause link 182 which is pivotally connected to the lower end of walking beam 110 and reciprocating link 168 which is connected to link 182 by means of member 184 to move to the right, thereby moving the lower end of operating arm 160 to the right, opening climb valve 148 and admitting reduced air pressure from manifold 52 to equalizer tank 138. The pressure within tank 138 will therefore become reduced and the altimeter 142 will indicate a higher assumed altitude of the trainer while the vertical speed indicator will indicate as assumed ascent and the rate thereof. The longer climb valve 148 remains open, of course, the greater will become the vacuum within tank 138 and, therefore, the greater will be the indicated assumed altitude.

On the other hand, a closing of throttle 92 will cause the lower end of walking beam 110 to move to the left in Fig. 2 and links 182 and 168 will likewise be moved to the left. The needle valve in climb valve 148 will remain closed because of the increased compression upon spring 180 but the valve in dive valve 150 will open, allowing communication between the atmospheric port 155 and equalizer tank 138. The pressure within equalizer tank 138 will therefore increase and, consequently, altimeter 142 will show an assumed decreased altitude and vertical speed indicator 144 will show an assumed descent and rate thereof.

The amount that either climb valve 148 or dive valve 150 is open depends upon the extent to which and the direction in which throttle 92 is moved. As in the case of the effect upon the assumed air speed as shown by air speed indicator 60 the magnitude of the movement of throttle 92 affects the rate of climb or descent as shown by vertical speed indicator 144 while the length of time that such a change remains in effect controls the amount of total change in assumed altitude indicated by altimeter 142.

It will be seen, therefore, that if throttle 92 is opened air speed indicator 60 shows an increased assumed air speed. This same movement opens climb valve 148 and, therefore, vertical speed indicator 144 and altimeter 142 show the fact of ascent and total change in assumed altitude. On the other hand, a closing of throttle 92 causes air speed indicator 60 to show a slower assumed air speed, altimeter 142 shows a loss of assumed altitude and vertical speed indicator 144 shows the assumed rate of descent. It will therefore be realized that air speed indicator 60, altimeter 142 and vertical speed indicator 144 respond to the settings of simulated throttle 92 in exact simulation of the response of the air speed indicator, altimeter and vertical speed indicator in a plane in actual flight to a change in the setting of the throttle in the plane.

Furthermore, this invention includes means whereby the vertical speed indicator and the altimeter may be made to respond not only to a change in the setting of the throttle of the trainer but to a change in the attitude of the trainer fuselage as well, as will now be explained.

It will be recalled that whenever trainer fuselage 10 pitches in simulation of the climbing of a plane in actual flight, stub shaft 112 will be moved toward the front of the trainer or to the left in Fig. 2 and walking beam 110 will pivot about the point where it is connected to link 108. The lower end of walking beam 110, links 182 and 168 will move to the right in Fig. 2, thereby opening climb valve 148. As before explained, this will cause altimeter 142 and vertical speed indicator 144 to register the assumed amount of ascent and rate thereof.

On the other hand, if the fuselage 10 is pitched in simulation of a dive, stub shaft 112 will be moved to the right in Fig. 2 or toward the rear of the trainer fuselage, links 182 and 168 will therefore be moved toward the front of the trainer and dive valve 150 will be opened. Altimeter 142 and vertical speed indicator 144 will therefore reflect the assumed change in altitude and rate thereof. It will also be recalled that when trainer fuselage 10 pitches in simulation of the climbing of a plane in actual flight air speed indicator 60 indicates a lower assumed air speed while if the trainer fuselage be pitched in simulation of the climbing of a plane in actual flight an increased assumed air speed is indicated.

Therefore, means are disclosed whereby the air speed indicator, vertical speed indicator and altimeter in the trainer respond to changes in the attitude of the trainer fuselage 10 in simulation of the responses of the same instrument of a plane in actual flight to a change in the attitude of the plane.

All of the previously-described mechanism forms no part of the instant invention but a description thereof is given, as has been stated, in order that the parts of my invention which will now be described may be more readily understood. For a further description of any of the preceding described parts reference is made to the mentioned U. S. Patents 1,825,462 and 2,099,857.

*Simulated constant speed propeller means*

The use of automatic or variable pitch propellers in airplanes has become quite general. Automatic or variable pitch propellers are also referred to as constant speed propellers. Such a system consists of a governor unit which remotely controls the pitch angle of the propeller blades by utilizing the engine lubricating oil pressure in such a manner as to keep the engine speed constant, within the limits of the governor, regardless of the throttle setting or manifold pressure which is, in such a plane, proportional to the power output of the plane.

In the flying of such a plane the pilot has under his control a propeller governor lever, or equivalent control, and this lever is positioned by the pilot so that the governor is set to the correct position to allow the engine to make the desired number of revolutions. This desired engine speed is ascertained by the pilot by a reference to the manufacturer's specifications which state the correct number of revolutions that the engine should make for any given flying condition, e. g., take-off, maximum rate of climb, cruising, etc.

Having thus set the propeller governor control the engine will, within the limits of the governor, maintain a constant speed regardless of the throttle setting or power output. In the event the power output is increased the mechanism increases the pitch of the blade, thereby increasing the load upon the engine, and the speed of the engine remains constant. If the power output is decreased the propeller pitch is automatically decreased and the speed of the engine remains constant. This type of propeller is to be contrasted with the ordinary type of fixed blade propellers with which an opening of the throttle causes an increase in the engine and propeller speeds while a closing of the throttle produces a decrease in the engine and propeller speeds.

Not only do the manufacturer's specifications state the optimum speed of the engine for each condition of flight but they also give the manifold pressure at which the plane should be flown for each condition of flight. The pilot, having set the propeller governor control to give the correct engine speed then sets the throttle to give the correct indicated manifold pressure. He then knowns that insofar as this phase of flight is concerned the ship is being properly flown.

The following means are provided whereby these phases of actual flight may be simulated in a grounded aviation trainer.

Shown in Fig. 2 is the vertical panel 48 which, as has been previously described, is affixed by means of screws 50 to the cross piece 44 in the bottom of fuselage 10. One end of transverse shaft 186 is pivotally held by bracket 188 which is affixed to platform 42 while the other end of this shaft is pivotally held by bracket 190 rigidly affixed to vertical member 48. Fixedly mounted upon this transverse shaft is vertical arm 192 to which is pivotally connected link 194. The other end of link 194 is pivotally connected to pitch action arm 126 to which reference has been previously made. Pivotally connected to transverse shaft 186 is arm 196 which has pivotally connected to its other end the arm or differential lever 198. Pivotally connected to arm 198 is a second vertical link 200 which has its upper end pivotally connected to bell crank 96 as shown. Also pivotally connected to arm 198 at a point near the rear end thereof is vertical shaft 202 which is formed integrally with the upper end of bellows 204 which is, of course, collapsible and extensible, and preferably made of a light metal construction. To the bottom end of this bellows is rigidly affixed another vertical link 206 which has placed thereupon a stop collar 208. A compression spring 210 surrounds the lower end of vertical link 206. In Fig. 2 the manifold pressure regulator bellows is designated generally by 214 and it will be seen that this bellows comprises a fixed upper portion 216 which is held in place by means of brackets 218 which are fixedly attached to vertical panel 48.

Figure 4:
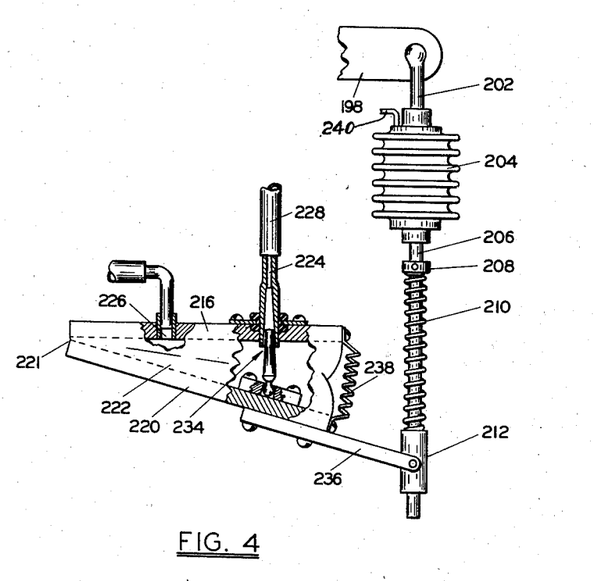
Fig. 4 is a view partly in cross section of the manifold pressure regulator bellows.

A detailed description of manifold pressure regulator bellows 214 is shown in Fig. 4. In that figure it will be seen that the lower portion 220 of the bellows is movably pivoted at the left end thereof 221 to the upper fixed part 216. This bellows is made air-proof by means of suitable collapsible and extensible covering material 222. Bellows 214 has two ports 224 and 226, port 224 being connected by means of connection 228 to a source of vacuum (not shown) which may be of any suitable type providing it maintains a constant level of reduced air pressure. Port 226 of manifold pressure regulator bellows 214 is connected to manifold pressure gauge 232 by means of connection 233. This gauge is also positioned on instrument panel 67. A bleed hole 235 is placed in line 233. This gauge is assumed to be in the trainer. As seen in Fig. 4, within bellows 214 is a needle valve designated generally by 234 which valve is in series with the connection 228 which goes to the source of reduced air pressure. Thus, when this needle valve is opened reduced air pressure from the vacuum source pump will be applied through connection 228 and port 224 to the manifold pressure bellows 214. Manifold pressure gauge is of the same type as air speed instrument 60 and it will therefore respond to the change in pressure within that bellows to indicate an assumed change in the manifold pressure of the "engine" in the trainer.

As stated above, the upper part 216 of manifold pressure bellows 214 is stationary while the lower part 220 is pivotally connected at the upper part at the left end thereof 221 as seen in Fig. 4. Rigidly connected to the right end of lower member 220 is a pair of arms designated by 236. Vertical rod 206 is free to slide in a swivel joint designated generally by 212. This swivel joint is held by arms 236 and the lower end of compression spring 210 presses against the upper surface of this joint. Spring 238 prevents extension 236 from falling off the lower end of vertical rod 206 when there is a very low vacuum (or pressure approaching atmospheric) within bellows 214.

Assuming that the compression upon spring 210 is increased, as will be later explained, the needle valve 234 will be opened and as the pressure within bellows 214 becomes gradually decreased through the reduced air pressure admitted through needle valve 234 bellows 214 gradually collapses until the pressure therewithin and the compression of spring 210, which forces tend to expand bellows 214 and open needle valve 234, exactly equal the atmospheric pressure on the outside of bellows 214, which tends to collapse the bellows and close the needle valve 234. When these opposing forces are balanced the source of vacuum acting through connection 228 will exhaust from bellows 214 the same amount of air that enters that bellows through the bleed hole 235 in connection 233.

Because of the above equation of forces, it will be realized that by varying the compression upon spring 210 the amount of vacuum necessary within bellows 214 to balance the atmospheric pressure on the outside of this bellows may be varied. Inasmuch as the manifold pressure gauge 232 is responsive to the pressure within bellows 214 this varying vacuum will in turn vary the reading of the gauge. Hence, by moving the vertical link 206 the compression upon spring 210 will be changed as will the vacuum within bellows 214. The greater the compression upon spring 210 the greater will become the vacuum within bellows 214 and the greater will be the indicated manifold pressure. The similarity between this system and the air speed system above described is evident.

Those familiar with the rules of aviation will realize that an opening of the throttle associated with an engine in a plane will cause the manifold pressure gauge associated with that engine to indicate an increased manifold pressure. Referring to Fig. 2 an opening of throttle 92, that is, a movement to the left in that figure will cause vertical link 200 to move downward, link 198 will pivot about the point at which it is attached to arm 196 and vertical link 202 likewise will move downward. Metal bellows 204 will also move in the same direction as will vertical link 206 and collar 208 and a greater compression will be placed upon spring 210. This in turn will push downwardly extension 236 and the bottom 220 of manifold pressure regulator bellows 214 and needle valve 234 will be opened. Vacuum from line 228 will therefore be applied to manifold pressure bellows 214 and the vacuum within this bellows will gradually increase until the vacuum within that bellows equals the compression upon spring 210. Consequently, a gradual increase in the manifold pressure as indicated by gauge 232 will result until this point is reached, at which time the air entering bellows 214 through bleed hole 235 will exactly equal the amount exhausted through needle valve 234. On the other hand, if throttle 92 be closed, that is moved to the right in Fig. 2, opposite movements will be imparted to the parts just described, the compression upon spring 210 will become decreased and the needle valve 234 will then tend to close. Less air will therefore be exhausted from the bellows 214 than enters through bleed hole 235 and the pressure within bellows 214 will increase until the compression upon spring 210 equals the vacuum within this bellows. When this point is reached as much air will be exhausted through the needle valve 234 as enters the system through bleed hole 235. A gradual decrease in the assumed manifold pressure as indicated by gauge 232 will occur until this point of equilibrium is reached.

The foregoing arrangement therefore provides means in a grounded aviation trainer whereby the simulated engine manifold pressure may be made to vary with a change in the setting of the throttle assumed to be associated with the engine in the same manner that the manifold pressure gauge in a plane in actual flight varies with a corresponding change in the setting of the throttle associated with the engine whose manifold pressure is being indicated.

It will be understood that the manifold pressure of an engine in a plane depends to a certain extent upon the altitude at which the ship is flying, the higher the altitude of the plane, other factors remaining constant, the lower becomes the manifold pressure of the engine or engines therein. In order that the reading of the manifold pressure gauge 232 disclosed herein will be modified by a change in the assumed altitude of the trainer altitude compensator bellows 204 to which reference has been previously made is connected by means of line 240 to the equalizer tank 138.

As has been previously explained, the pressure within equalizer tank 138 always varies in accordance with the assumed altitude of the trainer and, therefore, so will the pressure within altitude compensator bellows 204. The higher the assumed altitude of the trainer the lower becomes the pressure within equalizer tank 138 and, therefore, the lower becomes the pressure within altitude compensator bellows 204. Bellows 204 expands and contracts with changes in the pressure therein. As this bellows contracts the compression upon spring 210 decreases and as previously explained the assumed manifold pressure as indicated by manifold pressure gauge 232 will decrease. On the other hand, an increase in the pressure within equalizer tank 138 as a result of a lower assumed altitude of the trainer will result in an increase in the pressure within the altitude compensator bellows 204 and in an expansion thereof. An increase in the compression upon spring 210 will result and a higher assumed manifold pressure as indicated by gauge 232 will occur.

It will be realized, therefore, that the foregoing discloses means for varying the assumed engine manifold pressure in a grounded aviation trainer according to the assumed altitude of the trainer.

The third factor which affects the manifold pressure of the engine of a plane equipped with a constant speed propeller is the speed of the engine—the greater number of revolutions per minute that the engine is making the lower the manifold pressure. The following means have been incorporated in my invention in order that this functioning in a real plane may be simulated.

Seen in Fig. 2 is a lever 242 which is referred to in the art as the propeller governor control. This lever is pivotally attached to any suitable part of the inside of the trainer fuselage 10 and to its lower end is pivotally connected link 244, the other end of which is pivotally attached to bell crank 246. A vertical link 300 has its upper end attached to bell crank 246 and its lower end pivotally connected to the rearmost end of arm 302 which has its other end rigidly affixed to transverse shaft 304 held by brackets 306 attached to panel 48. The left end of shaft 304 has rigidly affixed thereto another arm 308 which has pivotally affixed to its rear end vertical link 310, the lower end of which is pivotally connected to the rear end of arm 196, which, as has been previously described, is pivotally mounted upon the transverse shaft 186.

It will be seen that a pushing forward of governor control lever 242 in Fig. 2, which action, as will be later shown, simulates the setting of the governor control in a real plane so that the engine may run at a higher speed, results in a downward movement of vertical link 300, and by means of arm 302, shaft 304 and arm 308, vertical link 310 moves in the same direction. The rear end of arm 196 moves downwardly also as does the forward end of arm 198, which, in this instance pivots about the point at which vertical link 200 is attached thereto. The rearmost end of arm 198 moves upwardly, the compression upon spring 210 becomes less and the simulated manifold pressure as indicated by gauge 232 becomes less. It will be realized that a movement of governor control 242 in the opposite direction, in simulation of the movement of the governor control in a real plane equipped with a constant speed propeller so as to decrease the speed of the engine, will result in opposite movement of the immediately aforedescribed parts and gauge 232 will reflect an increase in the simulated manifold pressure.

From the foregoing it will be understood that my invention comprises means for causing the simulated manifold pressure in a trainer of the type being described to respond to a change in the setting of the simulated governor control in simulation of the response of the change in the manifold pressure of a plane equipped with a constant speed propeller to a change in the setting of its governor control.

It may therefore be concluded that the foregoing discloses means whereby the indicated manifold pressure in a trainer of the type being described will depend upon the same factors as does the manifold pressure of the engines of a plane in actual flight, these factors being three in number: first, the setting of the throttle, second, the assumed altitude of the trainer, and finally, the setting of the propeller governor control.

My copending application Serial Number 452,739 of which this application is a continuation in part discloses means for varying the indicated assumed manifold pressure in response to the first two mentioned factors.

As has been explained, in Fig. 2 is lever designated 242 which is known as the propeller governor lever. To the lower end of this lever is pivotally connected link 244 the other end of which is pivotally connected to the upper end of bell crank 246. Vertical link 248 has its upper end pivotally connected to the other end of bell crank 246 and has pivotally connected to its lower end lever 250. The end of lever 250 foremost of the trainer fuselage 10 is pivotally mounted upon a stub shaft 252 and the rearmost end of another arm 254 holds stub shaft 252. The foremost end of arm 254 is rigidly affixed to transverse shaft 256 which is pivotally mounted in brackets 258 which are rigidly affixed to vertical panel 48. Another arm 260 is also rigidly affixed to shaft 256 and a vertical link 262 connects the rearmost end of this arm with the rearmost end of another arm 264 as shown. This last-mentioned arm is pivotally connected to still another arm 266 which is fixedly mounted upon transverse shaft 186. Vertical link 268 has its lower end pivotally attached to arm 264 and its upper end slides within block 270 which is affixed to bell crank 96. A stop 272 is upon the upper end of link 268 above block 270.

As also seen in Fig. 2, bracket 276 is fixedly attached to vertical member 48 and tension spring 278 has its lower end suitably hooked to this bracket. The upper end of this spring is attached to the stud shaft 252 to which reference has been previously made. Bracket 276 is threaded for the reception of vertical set screw 280, the upper end of which bears against the end of arm 254 as shown.

Pivotally connected to arm 250 at a point forward of the point where vertical link 248 attaches to arm 250 is another vertical link 282 which has placed thereupon a stop 284 below which is a compression spring 286. The tachometer regulator bellows which is designated generally in Fig. 2 by 288 is affixed to vertical panel 48 in the same manner as is manifold pressure regulator bellows 214. This tachometer regulator bellows together with tachometer 290 which is on instrument panel 67 is identical in all respects with the manifold pressure regulator bellows 214, the manifold pressure gauge 232, and associated mechanism. A detailed description thereof is therefore deemed unnecessary, it being deemed sufficient to state an increase in the compression upon the spring 286 results in an increase in the reading of tachometer 290, thereby indicating that the assumed engine in the trainer is assumed to be making a greater number of revolutions per minute, while a decrease in the compression upon this spring results in opposite functioning.

From the foregoing it will be realized that a pushing forward or to the left in Fig. 2 of propeller governor lever 242 results in a movement of vertical link 248 downwardly and the rearmost end of lever 250 moves in the same direction, lever 250 in this instance pivoting about the point where it is pivoted to stub shaft 252. Vertical link 282 moves in the same direction and the compression upon spring 286 is increased. Tachometer 290 therefore indicates that the assumed engine in the trainer is making a greater number of revolutions per minute. On the other hand, if propeller governor lever 242 is moved in the opposite direction by virtue of opposite movements of the immediately aforedescribed parts tachometer 290 will indicate that the assumed engine is turning at a less rapid rate.

It has been explained that the purposes of the constant speed or variable pitch propeller mechanism in a real plane is to provide means whereby the engine will, within the limits of the propeller governor, turn at a constant rate regardless of the power output of the engine. The power output of the engine, it has been explained, depends primarily upon the setting of the throttle, but in the event the throttle is set to produce a power outside the limitation which the propeller governor can effectively control, the number of revolutions of the engine will vary from that for which the propeller governor is set. My invention simulates this phase of actual flight in the following manner: It will be realized that when throttle 92 is closed to such an extent that block 270 engages stop 272 upon the upper end of vertical link 268 vertical link 268 will be raised and will raise the rear end of lever 264. Link 262 is therefore moved in the same direction as is the rear end of arm 260 and shaft 256 is turned in such a direction as to raise the rearmost end of arm 254. Stub shaft 252 will therefore be raised and arm 254 will be lifted from the top of set screw 280 against the action of spring 278. The forward end of lever 250 will therefore be raised, in this instance lever 250 pivoting about the point at which vertical link 248 is attached thereto, and vertical link 282 will likewise be raised. The compression upon spring 286 will be decreased and as previously explained, tachometer 290 will indicate that the "engine" in the trainer is making less revolutions per minute.

From the foregoing it will be realized therefore that my invention provides means whereby the falling off of the engine speed in a plane having a constant speed propeller when the power output is decreased below the range of the governor may be simulated in a grounded aviation trainer.

When the throttle setting or power output of a plane equipped with a constant speed propeller is such that the power developed by the engine cannot maintain the speed of the engine at that for which the propeller governor lever is set, if the plane be dived the decrease in load upon the engine results in an increase in the speed thereof. The following means have been provided in order that this phenomenon of actual flight may be simulated in a grounded aviation trainer:

It has been explained that whenever the throttle 92 is set below the assumed limitation of the "governor" of the "engine" of the trainer, block 270 pushes upward against collar 272 and through the action of link 268, arm 264, link 262, arm 260, shaft 256 and arm 254, stub shaft 252 is raised above set screw 280, arm 250 is moved and a decrease in the compression upon spring 286 results, resulting in a falling off of the indication of simulated tachometer 290. Therefore, in my invention whenever throttle 92 is set below the limit of the governor stub, shaft 252 is raised above set screw 280. If then the trainer fuselage 10 be dived, the lower end of pitch action arm 126 moves ahead as does link 194 and the upper end of arm 192. Shaft 186 is rotated so that the rear end of arm 266 is raised as is the forward end of arm 264, arm 264 in this instance pivoting about the point at which link 262 is attached thereto. The foremost end of arm 264 therefore moves upward as does link 268, raising stop 272 above block 270. Spring 278 simultaneously pulls stub shaft 252 and the rear ends of levers 254 and 260 down. Also link 262 moves down pushing the rear end of lever 264 down. This movement of lever 264 continues, pulling down link 268 until collar 272 again engages block 270. The downward movement of stub shaft 252 results in a similar movement of the fore end of arm 250, which, in this instance pivots about the point at which link 248 is attached thereto. Link 282 moves downwardly, an increase in the compression upon spring 286 results and tachometer 290 indicates an increased assumed engine speed.

It may therefore be concluded that my invention provides means whereby when the simulated speed of the engine assumed to be in the trainer is below the setting of the governor as a result of too low a power output, a diving of the trainer results in an increased indication by the simulated tachometer, thereby simulating the functioning of the engine and tachometer in a plane having a constant speed propeller under corresponding conditions of actual flight.

Referring again to a plane in actual flight for purposes of comparison, even though a plane be equipped with a constant speed propeller, if the throttle setting or power output is so low that the engine cannot maintain the speed for which the governor is set, when the plane assumes a climbing attitude a further falling off of the speed of the engine occurs. It will be readily understood that when the throttle lever 92 is set too low for the setting of governor lever 242, block 270 pushes up against stop 272. Then, when trainer fuselage 10 assumes a climbing attitude the lower end of pitch action arm 126 moves toward the rear as does link 194 and the upper end of vertical arm 192. A rotation of shaft 186 results such that the rear end of arm 266 moves downwardly as does the forward end of the arm 264, arm 264 in this instance pivoting about the point at which vertical link 268 is attached thereto, block 270 and stop 272 preventing a downward movement of link 268. Vertical link 262 therefore moves upwardly as does the rearmost end of arm 260. Shaft 256 is rotated, raising the rearmost end of arm 254, stub shaft 252 and the foremost end of arm 250. Arm 250 in this instance pivots about the point at which link 248 is attached thereto, link 282 is raised, the compression upon spring 286 is decreased and tachometer 290 indicates a slight falling off in the speed of the "engine" of the trainer.

It may be concluded, therefore, that my invention provides means for simulating the falling off of the decrease in the speed of the engine in a plane equipped with a constant speed propeller when the plane assumes a climbing attitude in the presence of a power setting too low for the setting of the governor.

From the foregoing it will be understood that my invention provides means for simulating in a grounded aviation trainer the functioning of the tachometer and manifold pressure gauge in a real plane equipped with a constant speed propeller. The student in the trainer, knowing the type of plane which he is assumed to be flying, will be able, by a reference to the manufacturer's specifications for such a plane, to ascertain the proper number of revolutions per minute and proper manifold pressure at which the plane should be flown for that condition of flight which it is assumed he is simulating. He will be able then to set propeller governor lever 242 in order that simulated manifold tachometer 290 indicates the correct number of revolutions per minute of the engine assumed to be in the trainer and he will, by a reference to the altimeter 142, be able to ascertain the manifold pressure at which the plane should be flown. By setting simulated throttle 92 properly the simulated manifold pressure gauge 232 will indicate the correct simulated manifold pressure. With a change in the assumed altitude of the trainer the pressure within equalizer tank 138 and altitude compensator bellows 204 varies as has been described and the simulated pressure indicated by gauge 232 will vary. It will then be the duty of the student to properly position throttle lever 92 in order that the manifold pressure gauge 232 will indicate the proper assumed manifold pressure.

As has been explained, simulated tachometer 290 and simulated manifold pressure gauge 232 are responsive to various movements of the fuselage 10, simulated throttle 92 and simulated propeller governor lever 242. Whenever manifold pressure gauge 232 or tachometer 290 indicates a quantity different from that at which the plane should be flown for the prevailing conditions of flight it is the duty of the student to correct these readings by a movement of the throttle lever 92, propeller governor 242 or fuselage 10. The advantages of having such means in a grounded aviation trainer are readily apparent.

Inasmuch as a preferred embodiment only of my invention has been shown numerous changes in the details of my invention may be made without departing from the spirit thereof.

I claim:

1. In a grounded aviation trainer comprising a fuselage mounted for changing its attitude in simulation of the diving and climbing of a plane in actual flight, means for simulating the functioning of the manifold pressure gauge and tachometer in a real plane equipped with a constant speed propeller, said means comprising a simulated throttle control and a simulated propeller governor control, a simulated manifold pressure gauge for indicating the assumed manifold pressure of an engine assumed to be associated with said gauge and a simulated tachometer for indicating the assumed speed of said assumed engine, means forming a part of said trainer operative in response to changes in the assumed altitude of said trainer, means for causing said gauge to register an assumed manifold pressure depending upon the combined setting of said throttle control, the setting of said governor control and in accordance with said assumed altitude-operated means, and means for causing said tachometer to register an assumed engine speed depending upon the combined setting of said governor control and attitude of said fuselage.

2. In a grounded aviation trainer comprising a fuselage mounted for changing its attitude in simulation of the diving and climbing of a plane in actual flight, means for simulating the functioning of the air speed indicator, manifold pressure gauge and tachometer in a real plane equipped with a constant speed propeller, said means comprising a simulated throttle control, a simulated propeller governor control and means forming a part of said trainer operative in response to changes in the assumed altitude of said trainer, a simulated air speed indicator for indicating the assumed air speed of said trainer, a simulated manifold pressure gauge for indicating the assumed manifold pressure of an engine assumed to be associated with said gauge and a simulated tachometer for indicating the assumed speed of said assumed engine, means for causing said air speed indicator to register an assumed air speed dependent upon the combined setting of said throttle control and the attitude of said fuselage, means for causing said gauge to register an assumed manifold pressure dependent upon the setting of said throttle control and in accordance with said assumed altitude-operated means, and means for causing said tachometer to register an assumed engine speed dependent upon the combined attitude of said fuselage and setting of said governor control.

3. In a grounded aviation trainer comprising a fuselage having a place for a student, means for simulating the functioning of the manifold pressure gauge and tachometer in a real plane equipped with a constant speed propeller, said means comprising a simulated throttle control, a simulated propeller governor control and means forming a part of said trainer operative in response to changes in the assumed altitude of said trainer, a simulated manifold pressure gauge for indicating the assumed manifold pressure of an engine assumed to be associated with said gauge and a simulated tachometer for indicating the assumed speed of said assumed engine, means for causing said gauge to register an assumed manifold pressure depending upon the setting of said throttle control and in accordance with said assumed altitude-operated means, and means for causing said tachometer to register an assumed engine speed dependent upon the combined setting of said throttle control and governor control.

4. In a grounded aviation trainer comprising a fuselage having a place for a student, means for simulating the functioning of the manifold pressure gauge and tachometer in a real plane equipped with a constant speed propeller, said means comprising a simulated throttle control and a simulated propeller governor control, a simulated manifold pressure gauge for indicating the assumed manifold pressure of an engine assumed to be associated with said gauge and a simulated tachometer for indicating the assumed speed of said assumed engine, means for causing said gauge to register an assumed manifold pressure depending upon the setting of said throttle control, and means for causing said tachometer to register an assumed engine speed depending upon the setting of said governor control and the setting of said throttle control only when said throttle control is positioned to the rear of a predetermined position.

5. In a grounded aviation trainer comprising a fuselage mounted for changing its attitude in simulation of the diving and climbing of a plane in actual flight, means for simulating the functioning of the manifold pressure gauge and a tachometer in a real plane equipped with a constant speed propeller, said means comprising a simulated throttle control and a simulated propeller governor control, a simulated manifold pressure gauge for indicating the assumed manifold pressure of an engine assumed to be associated with said gauge and a simulated tachometer for indicating the assumed speed of said assumed engine, means for causing said gauge to register an assumed manifold pressure depending upon the setting of said throttle control, and means for causing said tachometer to register an assumed engine speed depending upon the setting of said governor control and the setting of said throttle control when said throttle control is positioned outside certain predetermined limits, and means for causing said tachometer to indicate a higher reading when said throttle control is set outside said predetermined limits and said fuselage is placed in a simulated diving position.

6. In a grounded aviation trainer comprising a fuselage mounted for changing its attitude in simulation of the diving and climbing of a plane in actual flight, means for simulating the functioning of the manifold pressure gauge and tachometer in a real plane equipped with a constant speed propeller, said means comprising a simulated throttle control and a simulated propeller governor control, a simulated manifold pressure gauge for indicating the assumed manifold pressure of an engine assumed to be associated with said gauge and a simulated tachometer for indicating the assumed speed of said assumed engine, means for causing said gauge to register an assumed manifold pressure depending upon the setting of said throttle control, means for causing said tachometer to register an assumed engine speed depending upon the combined setting of said governor control, the attitude of said fuselage and the setting of said throttle control when said throttle control is positioned outside certain predetermined limits.

7. In a grounded aviation trainer comprising a fuselage having a place for a student, means for simulating the functioning of the manifold pressure gauge and tachometer in a real plane equipped with a constant speed propeller, said means comprising a simulated throttle control and a simulated propeller governor control, a simulated manifold pressure gauge and a simulated tachometer, a pair of bellows, a connection between one of said bellows and said simulated gauge for operating the gauge in response to movements of the bellows and a connection between the other bellows and said simulated tachometer for operating the tachometer in response to movements of the bellows, a mechanical connection between said simulated throttle control and said first bellows for operating the bellows in response to movements of said control, a mechanical connection between said governor control and said second bellows for operating the bellows in response to movements of the control, and an auxiliary connection between said simulated throttle control and said second bellows for operating the bellows when the control is positioned to the rear of a predetermined position.

8. In a grounded aviation trainer comprising a fuselage having a place for a student, means for simulating the functioning of the manifold pressure gauge and tachometer in a real plane equipped with a constant speed propeller, said means comprising a simulated throttle control, a simulated propeller governor control and means forming a part of said trainer operative in response to changes in the assumed altitude of said trainer, a simulated manifold pressure gauge for indicating the assumed manifold pressure of an engine assumed to be associated with said gauge and a simulated tachometer for indicating the assumed speed of said assumed engine, a pair of bellows, a connection between one of said bellows and said simulated gauge for operating the gauge in response to movements of the bellows and a connection between the other bellows and said simulated tachometer for operating the tachometer in response to movements of the bellows, a mechanical connection between said simulated throttle control and said first bellows for operating the bellows in response to movements of said control, a mechanical connection between said simulated governor control and said second bellows for operating the bellows in response to movements of the control, means for operating said first bellows in response to operations of said altitude responsive means, and an additional mechanical connection between said simulated throttle control and said second bellows for operating the bellows when the control is positioned to the rear of a predetermined position.

9. In a grounded aviation trainer comprising a fuselage having a place for a student, means for simulating the functioning of the manifold pressure gauge and tachometer in a real plane equipped with a constant speed propeller, said means comprising a simulated throttle control and a simulated propeller governor control, a simulated manifold pressure gauge and a simulated tachometer, a pair of bellows, a connection between one of said bellows and said simulated gauge for operating the gauge in response to movements of the bellows and a connection between the other bellows and said simulated tachometer for operating the tachometer in response to movements of the bellows, a mechanical connection between said simulated throttle control and said first bellows for operating the bellows in response to movements of said control, a mechanical connection between said simulated governor control and each of said bellows for operating each of said bellows in response to movements of the control, and an auxiliary mechanical connection between said simulated throttle control lever and said second bellows for operating the bellows when the control is positioned to the rear of a predetermined position.

10. In a grounded aviation trainer comprising a fuselage having a place for a student, means for simulating the functioning of the manifold pressure gauge and tachometer in a real plane equipped with a constant speed propeller, said means comprising a simulated throttle control and a simulated propeller governor control, a simulated manifold pressure gauge and a simulated tachometer, a pair of bellows, a connection between one of said bellows and said simulated gauge for operating the gauge in response to movements of the bellows and a connection between the other bellows and said simulated tachometer for operating the tachometer in response to movements of the bellows, a differential lever connected to said first bellows for operating the same, a mechanical connection between said simulated throttle control and said differential lever and a mechanical connection between said simulated propeller governor control and said differential lever for moving said differential lever in response to movements of said simulated throttle control and simulated governor control, a mechanical connection between said simulated propeller governor control and said second bellows for operating said second bellows in response to movements of said simulated propeller governor control, and an auxiliary connection between said simulated throttle control and said second bellows for operating the bellows when the control is positioned to the rear of a predetermined position.

KARL A. KAIL.

REFERENCES CITED

The following references are of record in the file of this patent:

UNITED STATES PATENTS

| Number | Name | Date |
|---|---|---|
| 1,797,794 | Rougerie | Mar. 24, 1931 |
| 1,825,462 | Link | Sept. 29, 1931 |
| 2,099,857 | Link | Nov. 23, 1937 |
| 2,195,036 | Palmer | Mar. 26, 1940 |
| 2,218,546 | Muller | Oct. 22, 1940 |
| 2,226,726 | Kramar | Dec. 31, 1940 |
| 2,243,973 | Mills | June 3, 1941 |
| 2,301,685 | DeFlorez | Nov. 10, 1942 |
| 2,321,799 | Cone | June 15, 1943 |
| 2,324,833 | Gold | July 20, 1943 |
| 2,326,764 | Crane | Aug. 17, 1943 |
| 2,327,997 | Carmody | Aug. 31, 1943 |
| 2,341,253 | West | Feb. 8, 1944 |
| 2,366,603 | Dehmel | Jan. 2, 1945 |
| 2,372,741 | Horsfield | Apr. 3, 1945 |